United States Patent
Fukuda

(10) Patent No.: US 7,551,241 B2
(45) Date of Patent: Jun. 23, 2009

(54) LIQUID CRYSTAL DISPLAY APPARATUS

(75) Inventor: Yutaka Fukuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 209 days.

(21) Appl. No.: 11/797,343

(22) Filed: May 2, 2007

(65) Prior Publication Data

US 2008/0129915 A1     Jun. 5, 2008

(30) Foreign Application Priority Data

May 12, 2006     (JP)     ............... 2006-134292

(51) Int. Cl.
*G02F 1/1333*     (2006.01)
(52) U.S. Cl. .......................... 349/58; 362/634
(58) Field of Classification Search .............. 349/58; 362/632–634
See application file for complete search history.

(56) References Cited

U.S. PATENT DOCUMENTS

| | | | | |
|---|---|---|---|---|
| 7,473,117 | B2 * | 1/2009 | Miyazono et al. | ............ 439/239 |
| 2003/0043310 | A1 * | 3/2003 | Cho | ............ 349/58 |
| 2003/0043312 | A1 * | 3/2003 | Nishida et al. | ............ 349/58 |
| 2003/0086261 | A1 | 5/2003 | Moon et al. | |
| 2004/0228111 | A1 | 11/2004 | Kuo et al. | |
| 2004/0252252 | A1 * | 12/2004 | Lee et al. | ............ 349/58 |
| 2005/0243571 | A1 | 11/2005 | Kang et al. | |
| 2006/0187374 | A1 * | 8/2006 | Yeom | ............ 349/58 |
| 2008/0101074 | A1 * | 5/2008 | Ogura et al. | ............ 362/382 |

FOREIGN PATENT DOCUMENTS

| | | |
|---|---|---|
| EP | 1 515 083 A1 | 3/2005 |
| JP | 6-59826 U | 8/1994 |
| JP | 08-076121 A | 3/1996 |
| JP | 2004-342335 A | 12/2004 |
| JP | 2005-203154 A | 7/2005 |
| JP | 2005-302721 A | 10/2005 |

\* cited by examiner

*Primary Examiner*—Ellen Kim
(74) *Attorney, Agent, or Firm*—Crowell & Moring LLP

(57) ABSTRACT

A liquid crystal display apparatus (1) comprises a liquid crystal display panel (2), a plurality of cold cathode tubes to illuminate the liquid crystal display panel 2 from a rear face side thereof, and a frame (7) to support the liquid crystal display panel (2) and the cold cathode tubes (3). The cold cathode tube (3) is fixed on the frame (7) with a tube fixing member (11) having a pair of hooking protrusions (11*c*) which are hooked with edges of a hooking hole (7*c*). A protective barrier (7*d*) is formed on a rear face of a bottom (7*a*) of the frame (7) to protrude outward and to enclose the hooking hole (7*c*), and a height of the protective barrier (7*d*) is higher than a height of the hooking protrusions (11*c*) when the hooking protrusions (11*c*) is hooked with the edges of the hooking hole (7*c*), thereby enabling to disengage the hooking protrusions (11*c*) from the hooking hole (7*c*) by touch of fingers of a worker during an assemble work of the liquid crystal display apparatus (1).

9 Claims, 6 Drawing Sheets

LIQUID CRYSTAL DISPLAY APPARATUS

BACKGROUND OF THE INVENTION

1. Field of the Invention

The present invention relates to a liquid crystal display apparatus that displays picture images of television broadcasting or a personal computer.

2. Description of the Related Art

In liquid crystal display, cold cathode tubes are conventionally used as a back light of a liquid crystal cell. The cold cathode tubes are equipped on a frame via tube fixing members. The tube fixing members are respectively attached to both ends of the frame. Each of the tube fixing members generally has hooking protrusions which are to be hooked on edges of hooking holes formed on the frame. The hooking protrusion is elastically deformable toward the inside of the hooking hole, so that the hooking protrusion can be hooked with the edge of the hooking hole by inserting the top end of the hooking protrusion into the hooking hole while each of the tube fixing member holds the cold cathode tubes, and thereby, the cold cathode tubes are fixed.

The top end of the hooking protrusion is protruded toward a rear face side of the frame with no protection even when the hooking protrusion is hooked with the edge of the hooking hole. If the finger of a worker touches the top end of the hooking protrusion, the hooking protrusion may disengage from the hooking hole. In such a case, the work to equip the cold cathode tube and the tube fixing members must be performed again. Alternatively, the worker must be worked the equipment of the cold cathode tube and the tube fixing members with paying attention not to touch the top end of the hooking protrusion. Consequently, the working efficiency to equip the cold cathode tube to the frame falls.

Japanese Laid-Open Patent Publication No. 2004-342335 discloses a conventional liquid crystal display apparatus in which a turning point of a U-shaped fluorescent lamp is held with a spacer tube so as to generate no stress at the turning point.

Japanese Laid-Open Patent Publication No. 2005-302721 discloses another conventional liquid crystal display apparatus in which a turning point of a U-shaped fluorescent lamp is stationary held so as not to move the fluorescent lamp.

Japanese Laid-Open Patent Publication No. 8-76121 discloses still another conventional liquid crystal display apparatus in which a turning point of a U-shaped fluorescent lamp is hooked with a hooking piece which is formed on a housing serving as a reflector.

Japanese Laid-Open Utility Model Publication No. 6-59826 discloses still another conventional liquid crystal display apparatus which enables to equip a lamp house on a circuit board easier with forming a guide groove.

These conventional liquid crystal display apparatuses, however, have substantially the same disadvantage as mentioned above.

SUMMARY OF THE INVENTION

The present invention is conceived to solve the above mentioned problems of the conventional liquid crystal display apparatus, and an object of the present invention is to provide a liquid display apparatus having a structure of fixing a cold cathode tube on a frame to prevent disengagement of a hooking protrusion from a hooking hole during assemble work of the liquid crystal display apparatus.

A liquid crystal display apparatus in accordance with an aspect of the present invention comprises: a liquid crystal display panel having a predetermined number of cells which are arranged in a matrix shape, wherein each cell transmits predetermined colored light corresponding to a voltage applied thereto; at least one cold cathode tube that emits light to illuminate the liquid crystal display panel from a rear face side thereof; a frame that has a bottom and at least one hooking hole formed on the bottom and supports the liquid crystal display panel and the cold cathode tube; and at least one tube fixing member which is attached to the frame so as to fix the cold cathode tube on the frame by holding the cold cathode tube between the tube fixing member and the frame.

The tube fixing member has at least one tube pressing portion that presses the cold cathode tube toward the bottom of the frame and a pair of hooking protrusions that is hooked with edges of the hooking hole formed on the bottom of the frame. A protective barrier formed on a rear face of the bottom of the frame to protrude outward so as to interrupt touch fingers of a worker to the hooking protrusions, thereby maintaining a hooking state of the hooking protrusions and the edges of the hooking hole.

According to such a configuration, the fingers of the worker is interrupted to touch the hooking protrusions by the protection barrier, even when the assemble work is performed while the frame is turned upside down to equip a circuit board on the rear face of the bottom of the frame, for example. Thus, the hooking protrusions are rarely disengaged from the edges of the hooking hole, so that the work to equip the cold cathode tube and the tube fixing members may not be performed again. Alternatively, the worker can roughly work to equip the cold cathode tube and the tube fixing members without paying attention not to touch the top end of the hooking protrusion. Consequently, the working efficiency to equip the cold cathode tube to the frame can be increased.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE EMBODIMENT

Figure 1:
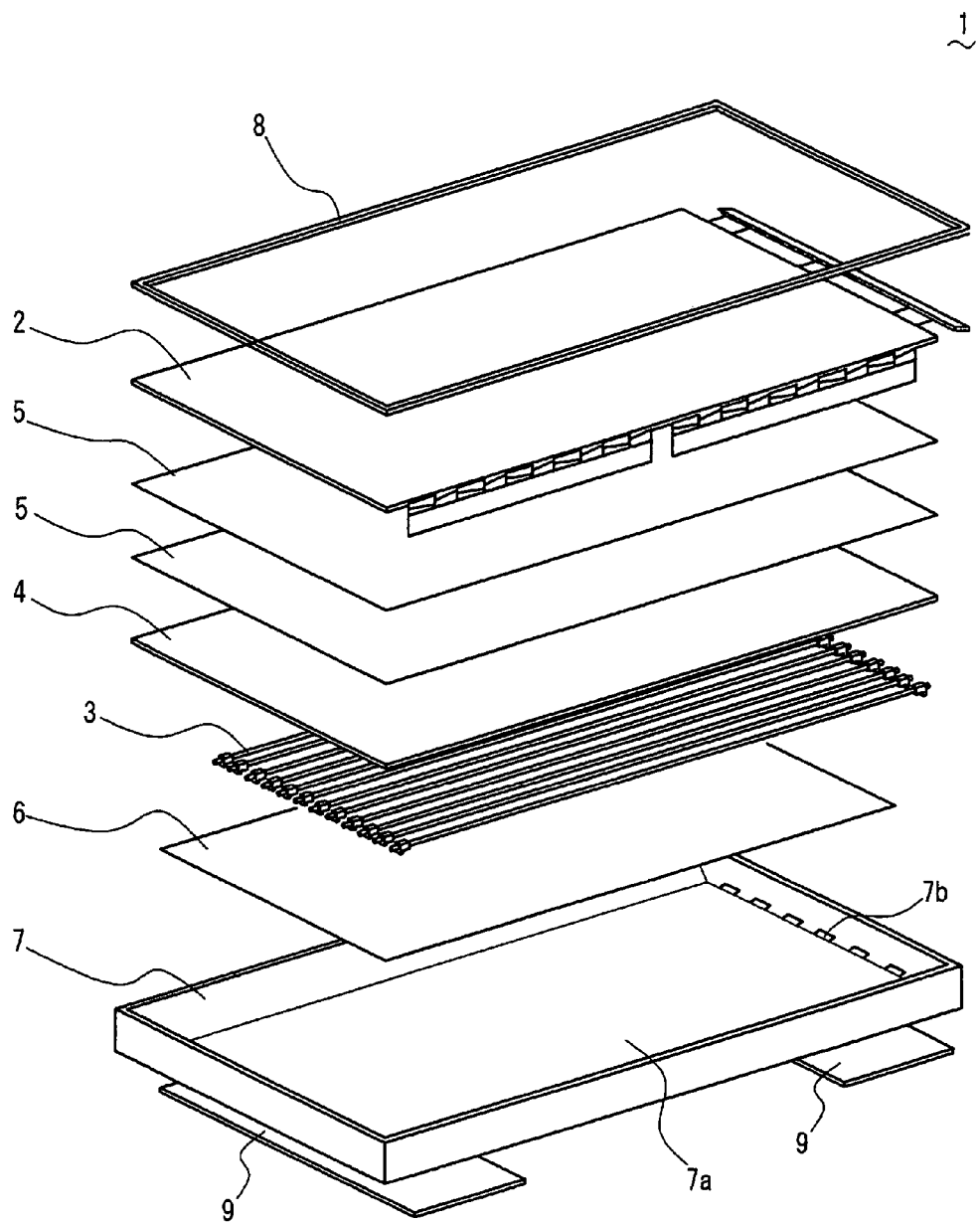
FIG. 1 is an exploded perspective view showing a configuration of a liquid display apparatus in accordance with an embodiment of the present invention.

A liquid crystal display apparatus in accordance with an embodiment of the present invention is described with reference to the figures. FIG. 1 shows a configuration of a liquid crystal display apparatus 1 in this embodiment.

The liquid crystal display apparatus comprises a liquid crystal panel 2 which displays picture images on a screen thereof, a plurality of cold cathode tubes 3 of a straight type which emits light from a rear face side of the liquid crystal panel 2, a light diffusion plate 4 and light diffusion sheets 5 which diffuse the light emitted from the cold cathode tubes 3, a reflector (reflection sheet) 6 which reflects the light emitted from the cold cathode tubes 3 toward the liquid crystal panel 2, and a frame 7 with a bottom which holds the liquid crystal panel 2, the cold cathode tubes 3, the light diffusion plate 4, the light diffusion sheets 5 and the reflector 6, a vessel 8 which fixes the liquid crystal panel 2, the cold cathode tubes 3, the light diffusion plate 4, the light diffusion sheets 5 and the reflector 6 on the frame 7, circuit boards 9 including a driving circuit of the liquid crystal display panel 2 to apply driving voltages to the liquid crystal panel 2, and a housing (not shown) to house the elements mentioned above.

The liquid crystal panel 2 has a predetermined number of cells which are arranged in matrix, and each cell transmits specific colored light corresponding to the voltage applied thereto from the driving circuit, thereby, a picture image is displayed on the screen of the liquid crystal panel 2. The cold cathode tubes 3 are arranged in parallel with each other in a longitudinal direction of the liquid crystal panel 2 (in a direction parallel to longer sides of the liquid crystal panel 2). The light diffusion plate 4 and the light diffusion sheets 5 are disposed between the cold cathode tubes 3 and the liquid crystal panel 2 so as to diffuse the light emitted from the cold cathode tubes 3 toward the liquid crystal panel 2 and the light emitted from the cold cathode tubes 3 opposite to the liquid crystal panel 2 and reflected by the reflector 6, thereby enabling to equalize the brightness of the picture image displayed on the screen of the liquid crystal panel 2. The reflector 6 is disposed along a bottom 7a of the frame 7 so as to reflect the light emitted from the cold cathode tubes 3 toward the liquid crystal panel 2. The driving circuit mounted on the circuit boards 9 applies the driving voltage to each cell of the liquid crystal panel 2 corresponding to image signals outputted from a control circuit (not shown in the figure). The cold cathode tubes 3, the light diffusion plate 4, the light diffusion sheets 5, the reflector 6 and so on configures a backlight device.

Figure 2:
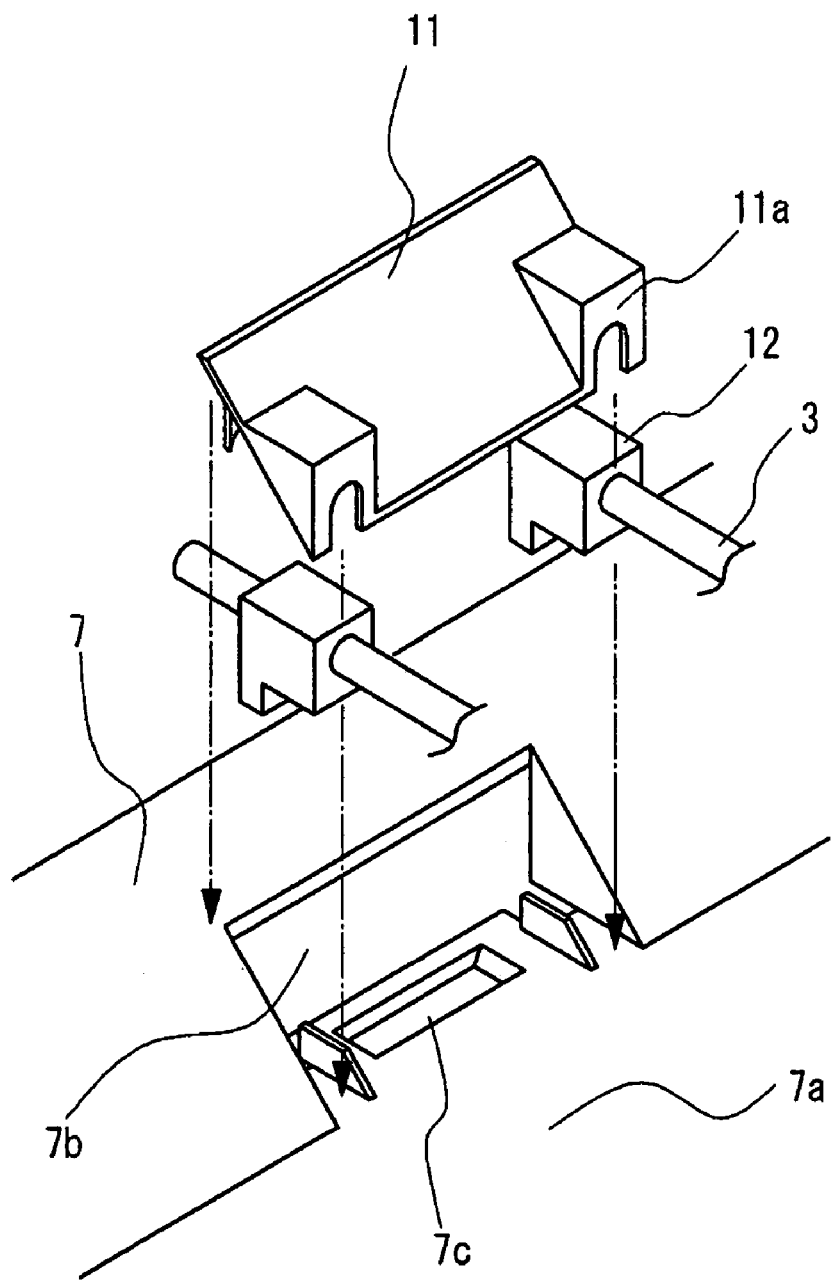
FIG. 2 is an exploded perspective view showing a structure to fix cold cathode tubes on a frame observed from a front face side of the frame.
Figure 3:
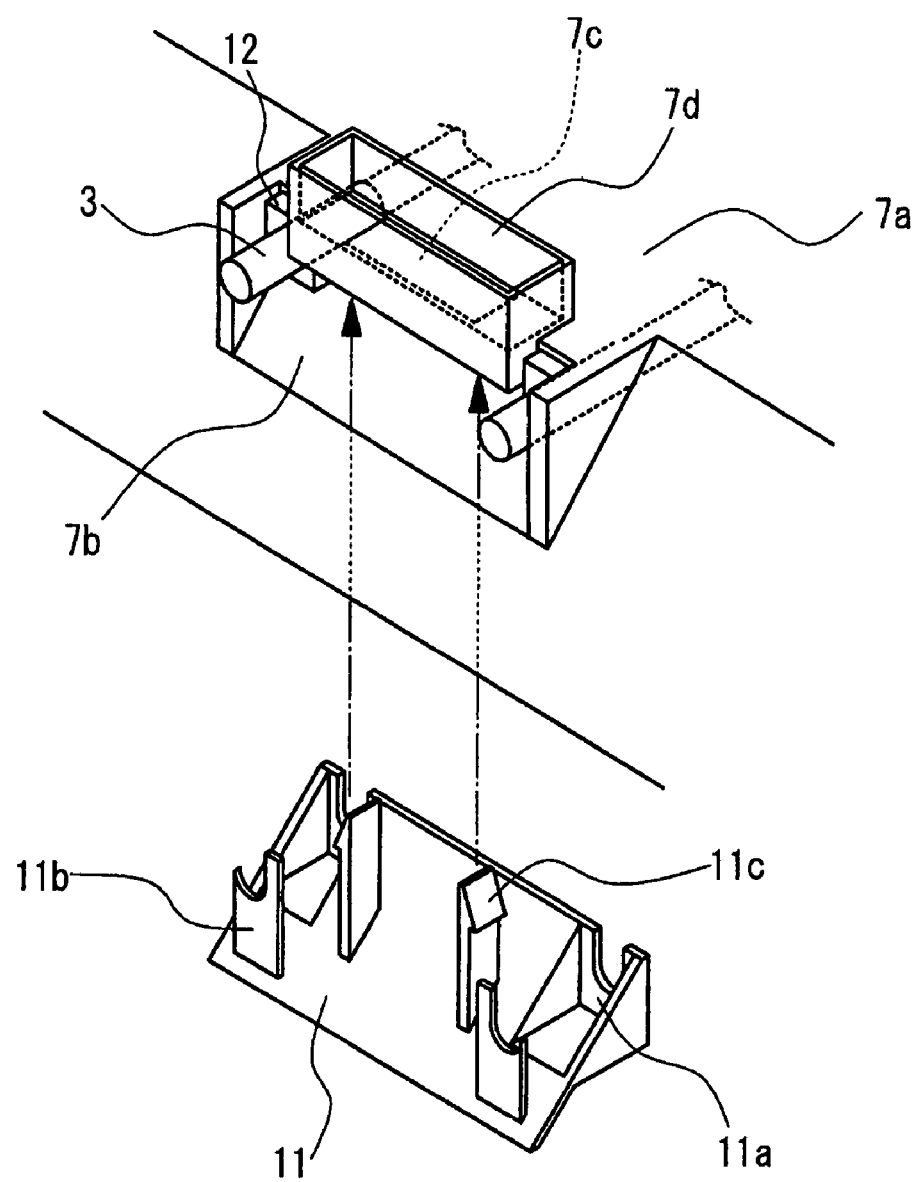
FIG. 3 is an exploded perspective view showing the structure to fix the cold cathode tubes on the frame observed from a rear face side of the frame.

FIGS. 2 and 3 respectively show a structure to fix the cold cathode tubes 3 on the frame 7. As shown in FIG. 1, a plurality of openings 7b are formed on both end walls (shorter walls) of the frame 7 in the longitudinal direction at a predetermined pitch, near to the bottom 7a, through which the cold cathode tubes 3 are inserted into an inner space of the frame 7. Pads 12 made of a rubber are attached to both ends of each cold cathode tube 3. The cold cathode tubes 3 are fixed on the frame 7 in pairs by tube fixing members 11 each of which is attached to one opening 7b of the frame 7. The pads 12, the frame 7 and the tube fixing members 11 are respectively formed to have shapes to be fitted each other. Each pad 12 has, for example, a cuboid shape.

Figure 4A:
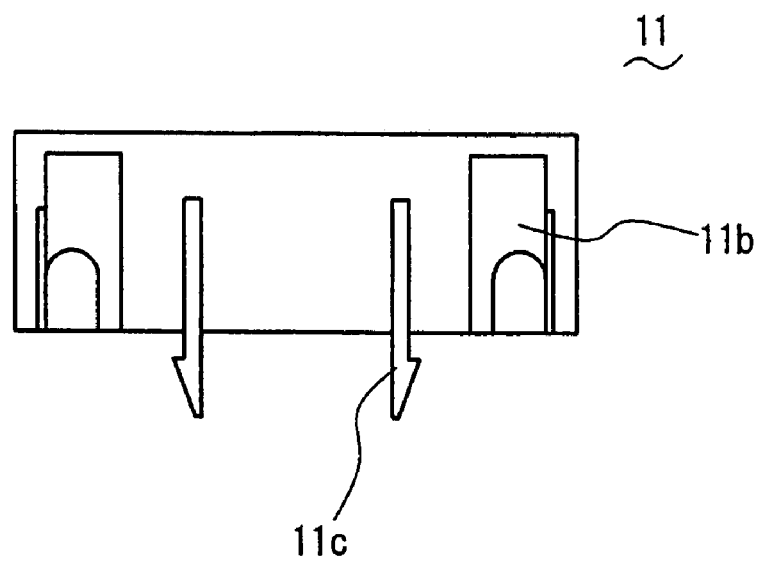
FIG. 4A is a rear view of a tube fixing member used in the structure to fix the cold cathode tubes on the frame.
Figure 4B:
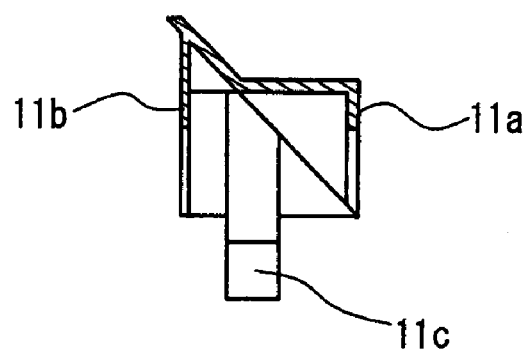
FIG. 4B is a sectional side view of the tube fixing member.

FIGS. 4A and 4B respectively show the configuration of the tube fixing member 11. The tube fixing member 11 is comprised of two sets of tube pressing portions 11a and 11b which press the pads 12 to the bottom 71 of the frame 7, and a pair of hooking protrusions 11c which are to be hooked with edges of a hooking hole 7c formed at a position near to each opening 7b on the bottom 7a of the frame 7. The tube pressing portions 11a and 11b and the hooking protrusions 11c are formed to protrude toward the bottom 7a of the frame 7 when the tube fixing member 11 is attached to the frame 7. The hooking protrusion 11c is formed between the tube pressing portions 11a and 11b in the side view as shown in FIG. 4B. Thus, when the fixing protrusions 11c are hooked with the edges of the hooking hole 7c, the pads 12 are pressed evenly by the tube pressing portions 11a and 11b. The fixing protrusions 11c are elastically deformable to close each other in FIG. 4A in a direction parallel to the shorter walls of the frame 7. The hooking protrusions 11c are hooked with the hooking hole 7c with elastically deforming the hooking protrusions 11c so that the tube fixing member 11 is attached to the opening 7b of the frame 7, as shown in FIGS. 2 and 3.

Figure 5A:
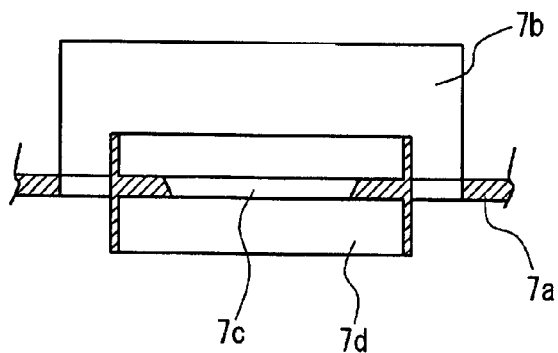
FIG. 5A is a sectional rear view of a portion of a frame to which the tube fixing member is attached.
Figure 5B:
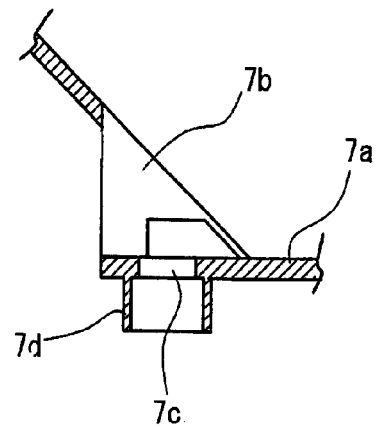
FIG. 5B is a sectional side view of portion of the frame.
Figure 6:
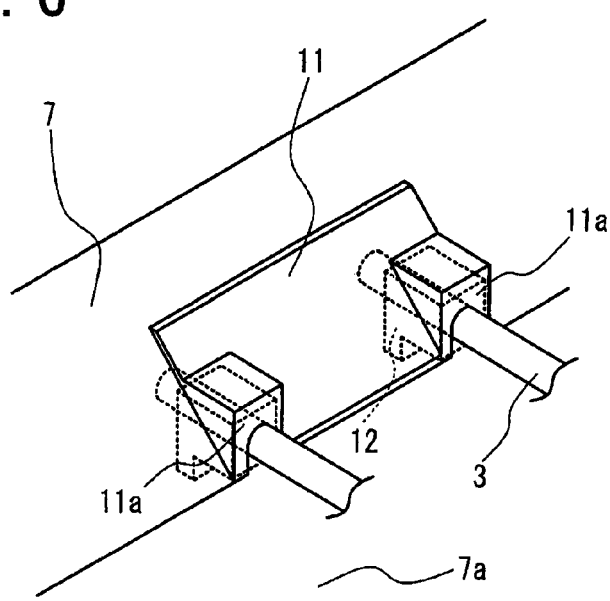
FIG. 6 is a perspective view showing a state of the structure after fixing the cold cathode tubes on the frame observed from the front face side of the frame.

FIGS. 5A and 5B respectively show a configuration of a portion of the frame 7 to which the tube fixing member 11 is attached. The hooking hole 7c having a rectangular shape is formed on the bottom 7c of the frame 7, and a protective barrier 7d having a rectangular sectional shape is formed to enclose the hooking hole 7c on a rear face of the bottom 7a of the frame 7 to protrude outward. The height of the protective barrier 7d is selected to be higher than protruding height of the hooking protrusions 11c from the rear face of the bottom 7a of the frame when hooking protrusions 11c are hooked with the edges of the hooking hole 7c (refer to FIG. 8).

FIGS. 6, 7, 8A and 8B respectively show a state that the cold cathode tubes 3 are fixed on the frame 7 via the tube fixing member 11. The cold cathode tubes 3 are equipped to the frame 7 under a state that the pads 12 attached to the cold cathode tubes 3 are held between the tube pressing portions 11a and 11b and the bottom 7a of the frame 7.

Figure 7:
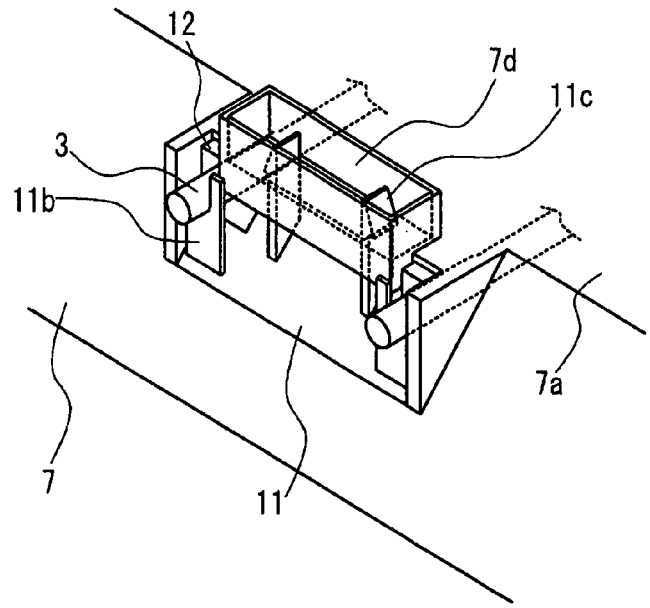
FIG. 7 is a perspective view showing the state of the structure after fixing the cold cathode tubes on the frame observed from the rear face side of the frame.
Figure 8A:
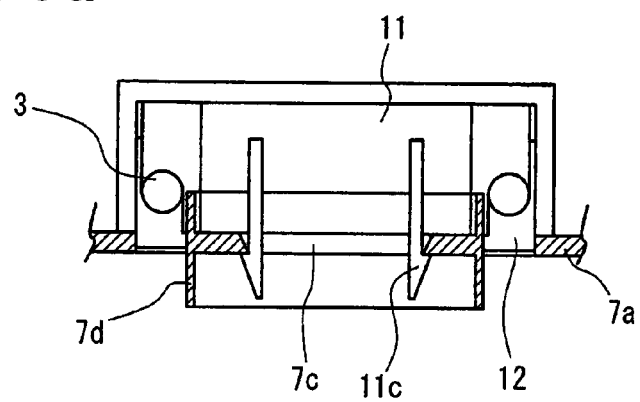
FIG. 8A is a sectional rear view showing the structure after fixing the cold cathode tubes on the frame.
Figure 8B:
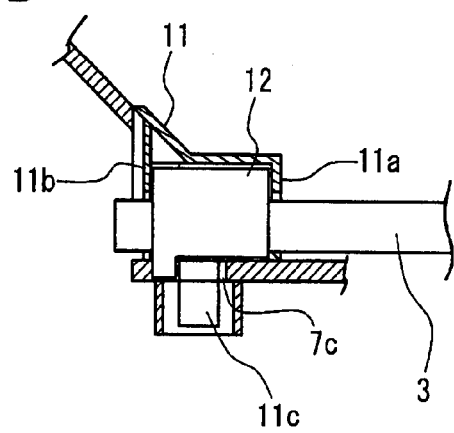
FIG. 8B is a sectional side view showing the structure after fixing the cold cathode tubes on the frame.

As shown in FIGS. 7, 8A and 8B, since the protective barrier 7d is formed along hour sides to enclose the hooking hole 7c, fingers of a worker never touches the hooking protrusions 11c directly even when the circuit boards 9 are equipped on the frame 7 while the frame 7 is turned upside down, for example.

As mentioned above, according to the liquid crystal display apparatus in accordance with this embodiment, the protective barrier 7d is formed to protrude from the rear face of the bottom 7a of the frame 7 and to enclose the hooking hole 7c, so that the fingers or the like of the worker never touches the hooking protrusions 11c directly in the assemble work of the apparatus even when the fingers of the worker approaches to the hooking protrusions 11c in any direction. Therefore, the hooking protrusions 11c rarely disengage from the edges of the hooking holes 7c, and thereby, the assemble work of the liquid crystal display apparatus can be performed easier. In addition, since the height of the protective barrier 7d is selected to be higher than the height of the hooking protrusions 11c when the hooking protrusions 11c are hooked with the edges of the hooking hole 7c, it is possible to interrupt the fingers of the worker to touch the hooking protrusions 11c, more effectively. Consequently, the working efficiency of the assemble work of the liquid crystal display apparatus can be increased because the worker is required to pay no attention to touch his or her fingers to the top ends of the hooking protrusions 11c. Moreover, since the pads 12 made of a rubber are attached to both ends of each cold cathode tube 3, the cold cathode tubes 3 can be fixed on the frame 7 with no blemish.

Furthermore, the present invention is not limited to the above mentioned configuration of the embodiment. It is preferable that at least a protective barrier 7d is formed to protrude outward on a rear face of the bottom 7a of the frame 7 so as to maintain the hooking state of the hooking protrusions 11c and the edges of the hooking hole 7c. The protective barrier 7d is not necessarily required to enclose the hooking hole 7c. A plurality of protective barriers may be formed partially along the sides of the hooking hole so as to interrupt the touch of the fingers of the worker to the hooking protrusions. For example, the protective barriers are formed along the sides of each of the hooking holes with which the hooking protrusions are hooked.

The cold cathode tubes 3 are not limited to the straight type ones, so that one or more U-shaped cold cathode tube can be used.

Therefore, the liquid crystal display apparatus in accordance with the present invention comprises at least: a liquid crystal display panel having a predetermined number of cells which are arranged in a matrix shape, wherein each cell transmits predetermined colored light corresponding to a voltage applied thereto; at least one cold cathode tube that emits light to illuminate the liquid crystal display panel from a rear face side thereof; a frame that has a bottom and at least one hooking hole formed on the bottom and supports the liquid crystal display panel and the cold cathode tube; and at least one tube fixing member which is attached to the frame so as to fix the cold cathode tube on the frame by holding the cold cathode tube between the tube fixing member and the frame. The tube fixing member has at least one tube pressing portion that presses the cold cathode tube toward the bottom of the frame and a pair of hooking protrusions that is hooked with edges of the hooking hole formed on the bottom of the frame. A protective barrier formed on a rear face of the bottom of the frame to protrude outward so as to interrupt touch fingers of a worker to the hooking protrusions, thereby maintaining a hooking state of the hooking protrusions and the edges of the hooking hole.

In the above mentioned configuration, it is preferable that the protective barrier should be formed to enclose the hooking holes.

Alternatively, it is preferable that a plurality of the protective barriers should be along sides of the hooking hole with which the hooking protrusions are hooked.

Furthermore, it is preferable that a height of the protective barrier be higher than a height of the hooking protrusions when the hooking protrusions are hooked with the edges of the hooking hole.

Still furthermore, it is preferable that a pad made of a rubber be attached to a portion of the cold cathode tube where the cold cathode tube is held by the tube fixing member so that the cold cathode tube is fixed on the frame with no blemish.

Still furthermore, it is preferable that the cold cathode tube be a straight type one; and both ends of the cold cathode tube are held by a pair of tube fixing members.

Still furthermore, it is preferable that two cold cathode tubes be fixed on the frame in pairs by a pair of tube fixing members.

Still furthermore, it is preferable that at least a circuit board including a driving circuit of the liquid crystal display panel be further provided on a rear face of the bottom of the frame.

This application is based on Japanese patent application 2006-134292 filed May 12, 2006 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A liquid crystal display apparatus comprising:
   a liquid crystal display panel having a predetermined number of cells which are arranged in a matrix shape, wherein each cell transmits predetermined colored light corresponding to a voltage applied thereto;
   at least one cold cathode tube that emits light to illuminate the liquid crystal display panel from a rear face side thereof;
   a frame that has a bottom and at least one hooking hole formed on the bottom and supports the liquid crystal display panel and the cold cathode tube; and
   at least one tube fixing member which is attached to the frame so as to fix the cold cathode tube on the frame by holding the cold cathode tube between the tube fixing member and the frame, wherein
   the tube fixing member has at least one tube pressing portion that presses the cold cathode tube toward the bottom of the frame and a pair of hooking protrusions that is hooked with edges of the hooking hole formed on the bottom of the frame; and
   a protective barrier formed on a rear face of the bottom of the frame to protrude outward so as to interrupt touch fingers of a worker to the hooking protrusions, thereby maintaining a hooking state of the hooking protrusions and the edges of the hooking hole.

2. The liquid crystal display apparatus in accordance with claim 1, wherein
   the protective barrier is formed to enclose the hooking holes.

3. The liquid crystal display apparatus in accordance with claim 1, wherein
   a plurality of the protective barriers is along sides of the hooking hole with which the hooking protrusions are hooked.

4. The liquid crystal display apparatus in accordance with claim 1, wherein
   a height of the protective barrier is higher than a height of the hooking protrusions when the hooking protrusions are hooked with the edges of the hooking hole.

5. The liquid crystal display apparatus in accordance with claim 1, wherein
   a pad made of a rubber is attached to a portion of the cold cathode tube where the cold cathode tube is held by the tube fixing member so that the cold cathode tube is fixed on the frame with no blemish.

6. The liquid crystal display apparatus in accordance with claim 1, wherein
   the cold cathode tube is a straight type one; and both ends of the cold cathode tube are held by a pair of tube fixing members.

7. The liquid crystal display apparatus in accordance with claim 6, wherein
   two cold cathode tubes are fixed on the frame in pairs by a pair of tube fixing members.

8. The liquid crystal display apparatus in accordance with claim 1, wherein
   at least a circuit board including a driving circuit of the liquid crystal display panel is further provided on a rear face of the bottom of the frame.

9. A liquid crystal display apparatus comprising:
   a liquid crystal display panel having a predetermined number of cells which are arranged in a matrix shape, wherein each cell transmits predetermined colored light corresponding to a voltage applied thereto;

a plurality of cold cathode tubes of a straight type that is arranged in parallel with each other to face a rear face of the liquid crystal display panel and emits light to illuminate the liquid crystal display panel from a rear face side thereof;

at least one light diffusion plate or sheet provided between the cold cathode tubes that diffuses light emitted from the cold cathode tubes;

a reflector provided at a position opposite to the liquid crystal display panel with respect to the cold cathode tubes to reflect light emitted from the cold cathode tubes toward the liquid crystal display panel;

a frame that has a bottom and a plurality of hooking holes each having a rectangular shape formed on the bottom along both end walls of the frame in a direction of arrangement of the cold cathode tubes and supports the liquid crystal display panel, the cold cathode tube, the light diffusion plate or sheet and the reflector;

a plurality of tube fixing member each having a pair of hooking protrusions hooked with edges of the hooking hole so as to be attached to a portion of the frame near to the hooking hole and fixes the cold cathode tubes on the frame in pairs by holding end portions of the cold cathode tubes between the tube fixing member and the frame; and at least one circuit board including a driving circuit of the liquid crystal display panel and provided on the rear face of the bottom of the frame, wherein the hooking protrusions of each of the tube fixing member are arranged in a direction parallel to the arrangement of the cold cathode tubes when the tube fixing member is attached to the frame and elastically deformable to close each other;

a protective barrier is formed on a rear face of the bottom of the frame to protrude outward and to enclose each of the hooking hole; and a height of the protective barrier is higher than a height of the hooking protrusions protruding outward from the rear face of the bottom of the frame when the hooking protrusions are hooked with the edges of the hooking hole, thereby enabling to prevent disengagement of the hooking protrusions from the edges of the hooking holes by interrupting touch of fingers of a worker to the hooking protrusions during assemble work of the liquid crystal display apparatus.

\* \* \* \* \*